United States Patent
Alloway et al.

(10) Patent No.: US 8,821,069 B2
(45) Date of Patent: Sep. 2, 2014

(54) LINEAR PIPE RECOVERY/LAY TENSIONERS AND METHODS OF USING SAME

(75) Inventors: Patrick K. Alloway, Magnolia, TX (US); Kevin L. Preston, Houston, TX (US); Loren D. Skiles, Tomball, TX (US)

(73) Assignee: Control Flow, Inc., Houston, TX (US)

( * ) Notice: Subject to any disclaimer, the term of this patent is extended or adjusted under 35 U.S.C. 154(b) by 116 days.

(21) Appl. No.: 13/357,007

(22) Filed: Jan. 24, 2012

(65) Prior Publication Data

US 2013/0189035 A1    Jul. 25, 2013

(51) Int. Cl.
  *F16L 1/23*        (2006.01)
  *E21B 19/22*       (2006.01)

(52) U.S. Cl.
  USPC .......................... 405/168.4; 226/173

(58) Field of Classification Search
  USPC ............ 405/166, 168.1, 168.4, 184; 226/172, 226/173, 188; 166/77.3; 74/162
  See application file for complete search history.

(56) References Cited

U.S. PATENT DOCUMENTS

| | | | |
|---|---|---|---|
| 3,754,474 A * | 8/1973 | Palynchuk ...................... 74/162 |
| 3,982,402 A | 9/1976 | Lang et al. |
| 4,230,421 A | 10/1980 | Springett et al. |
| 4,269,540 A | 5/1981 | Uyeda et al. |
| 4,297,054 A | 10/1981 | Yenzer et al. |
| RE30,846 E | 1/1982 | Lang et al. |
| 4,340,322 A | 7/1982 | Springett et al. |
| 4,345,855 A | 8/1982 | Uyeda et al. |
| 4,469,267 A * | 9/1984 | Franchuk et al. ............. 226/172 |
| 4,687,376 A | 8/1987 | Recalde |
| 4,721,411 A | 1/1988 | Recalde |
| 4,723,874 A | 2/1988 | Recalde |
| 4,765,776 A | 8/1988 | Howson |
| 4,789,108 A | 12/1988 | Recalde |
| 4,820,082 A | 4/1989 | Recalde |
| 4,917,540 A | 4/1990 | Recalde |
| 4,961,671 A | 10/1990 | Recalde |
| 4,984,934 A | 1/1991 | Recalde |
| 5,451,084 A * | 9/1995 | Jansch ........................ 166/77.53 |
| 5,527,134 A | 6/1996 | Recalde |
| 5,533,834 A | 7/1996 | Recalde |
| 5,692,859 A * | 12/1997 | Dickson et al. ............ 405/168.4 |
| 6,056,478 A | 5/2000 | Martin et al. |
| 6,328,502 B1 | 12/2001 | Hickey et al. |

(Continued)

OTHER PUBLICATIONS

Sparrows Baricon, Cable/Pipe Tensioner, Model BS199-15.0 Te., Sparrows Baricon, Aberdeen, UK (undated).

*Primary Examiner* — John Kreck
*Assistant Examiner* — Kyle Armstrong

(57) ABSTRACT

Linear pipe recovery/lay tensioners can include one or more pivot assemblies for rotatably moving an upper track away from a lower track to facilitate placement of a pipe segment between the two tracks. In addition, or alternatively, the tensioners can include one or more hydraulic cylinders that provide flexible suspension to the upper and lower tracks so the tracks can move and rotate as necessary due to differing pipe segment shapes. In addition, or alternatively, the upper and lower tracks include one or more gripping pad having one or more gripping member that is sheathed by a compliant member until such time as the pipe segment compresses the compliant member causing the gripping member(s) to protrude from the compliant member and bite into the pipe segment. Rotation of the tracks is controlled by a hydraulic pump capable of rotating the tracks at the same rate or at different rates.

14 Claims, 6 Drawing Sheets

(56) References Cited

U.S. PATENT DOCUMENTS

| | | |
|---|---|---|
| 6,524,030 B1 | 2/2003 | Giovannini et al. |
| 6,691,743 B2 | 2/2004 | Espinasse |
| 7,044,685 B2 | 5/2006 | Wybro et al. |
| 7,189,028 B1 | 3/2007 | Signaroldi et al. |
| 7,452,162 B2 | 11/2008 | Wybro et al. |
| 7,927,040 B2 | 4/2011 | Wilson |
| 2003/0219313 A1* | 11/2003 | Giovannini et al. ......... 405/158 |
| 2005/0019100 A1 | 1/2005 | Simpson |
| 2008/0017388 A1* | 1/2008 | Kulhanek et al. ............. 166/381 |
| 2010/0034592 A1* | 2/2010 | Roodenburg et al. ......... 405/169 |

* cited by examiner

LINEAR PIPE RECOVERY/LAY TENSIONERS AND METHODS OF USING SAME

BACKGROUND

1. Field of Invention

The invention is directed to roller assemblies for linearly transporting one or more pipe segments, or joints, such as pipelines, and in particular, to linear pipe recovery/lay tensioners for pulling a portion of pipeline from the ocean to be recovered on an offshore lay-barge and for laying pipeline from an offshore lay-barge and onto the ocean floor.

2. Description of Art

Linear pipe tensioners are generally known in the art. These devices are generally installed on a ship or lay barge to facilitate laying or retrieving pipe, such as pipelines and other pipe segments. Linear pipe tensioners are designed to maintain a constant tension on the pipe while the pipes are being lowered into, or retrieved from, the sea during offshore pipe laying operations.

Broadly, linear pipe tensioners consist of an upper and a lower track, each supported in a frame assembly. Pneumatically actuated squeeze bags within the track loops apply squeeze forces on the tracks holding the pipe. The tracks are driven by hydraulic motors through cage-mounted gear reducers. The upper track can be adjustable vertically for handling of various sizes of pipe. An electronics package comprising a control console and PLC operates the electronic components necessary for system operation. Pressure to track drive motors is controlled to maintain pipe tension within selected limits.

Two or more linear pipe tensioners can be arranged in series to provide the desired or necessary tension in the pipeline for laying or retrieving the pipeline.

In operation, generally, when an operator sets a tension value and starts the linear pipe tensioner, stepper motors mounted on the hydraulic pumps are rotated under command from the electronic control system. Greater rotation increases the volume of hydraulic fluid from the pumps to the motors. The motors then increase the amount of tension against the pipe.

Load cells, mounted between the linear pipe tensioners and their bedplates, transmit a signal proportional to the amount of tension against the pipe to the electronic control system. When the signal from the load cells balances the signal from the tension, a preset circuit the stepper motors stop rotating and hold their positions. This keeps the hydraulic pumps on a stroke which produces sufficient pressure to hold the desired tension. Small movements of the lay-barge do not produce any significant change in the tension. Movements beyond a pre-set dead-band will produce changes in tension transmitted back to the control system. The tension command will become unbalanced and the control system will drive the pumps producing pressure to the hydraulic motors to bring the tension back into line.

SUMMARY OF INVENTION

The linear pipe tensioners disclosed herein facilitate one or both of recovery of pipe segments from their locations of installation, and installation of the pipe segments in their locations of installation. In certain embodiments, the linear pipe tensioner comprise upper and lower frames, the upper frame having an upper track and the lower frame having a lower track. The upper and lower frames are pivotally connected to each other to facilitate movement of the upper frame and, thus, the upper track, between a closed position and a plurality of opened positions. Movement of the upper frame facilitates placement of a pipe segment between the upper and lower tracks.

In other certain embodiments of the linear pipe tensioners, the upper and lower frames are not required to be pivotally connected, although the upper and lower frames can be pivotally connected. In these embodiments, one or both of the upper or lower tracks are operatively associated with one or more cylinders that permit vertical and/or rotational movement of one or both of upper and lower tracks.

In still other embodiments of the linear pipe tensioners, the upper and lower frames are not required to be pivotally connected and the one or more cylinders are not required to be present, although one or more of these features can be included. In these embodiments, one or more gripping pads is operatively associated with either the upper or lower tracks. One or more of these gripping pads comprise a compliant member having a slot and a gripping member disposed within the first slot such that compression of the compliant member causes at least a portion of the gripping member to be exposed from the slot. In so doing, the gripping member engages a pipe segment to facilitate linear movement of the pipe segment through the linear pipe tensioners.

In additional embodiments, which may or may not include one or more of the features discussed above, two drive assemblies move the tracks which, in turn, linearly move a pipe segment through the linear pipe tensioners. The two drive assemblies are operatively associated with a motor or pump and a valve. The valve facilitates placing the drive assemblies in either series or parallel such that the two drive assemblies can rotate at substantially the same rate or at different rates. In these embodiments, the structural components identified above in this Summary can also be part of the linear pipe tensioners, although they are not required.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

Figure 1:
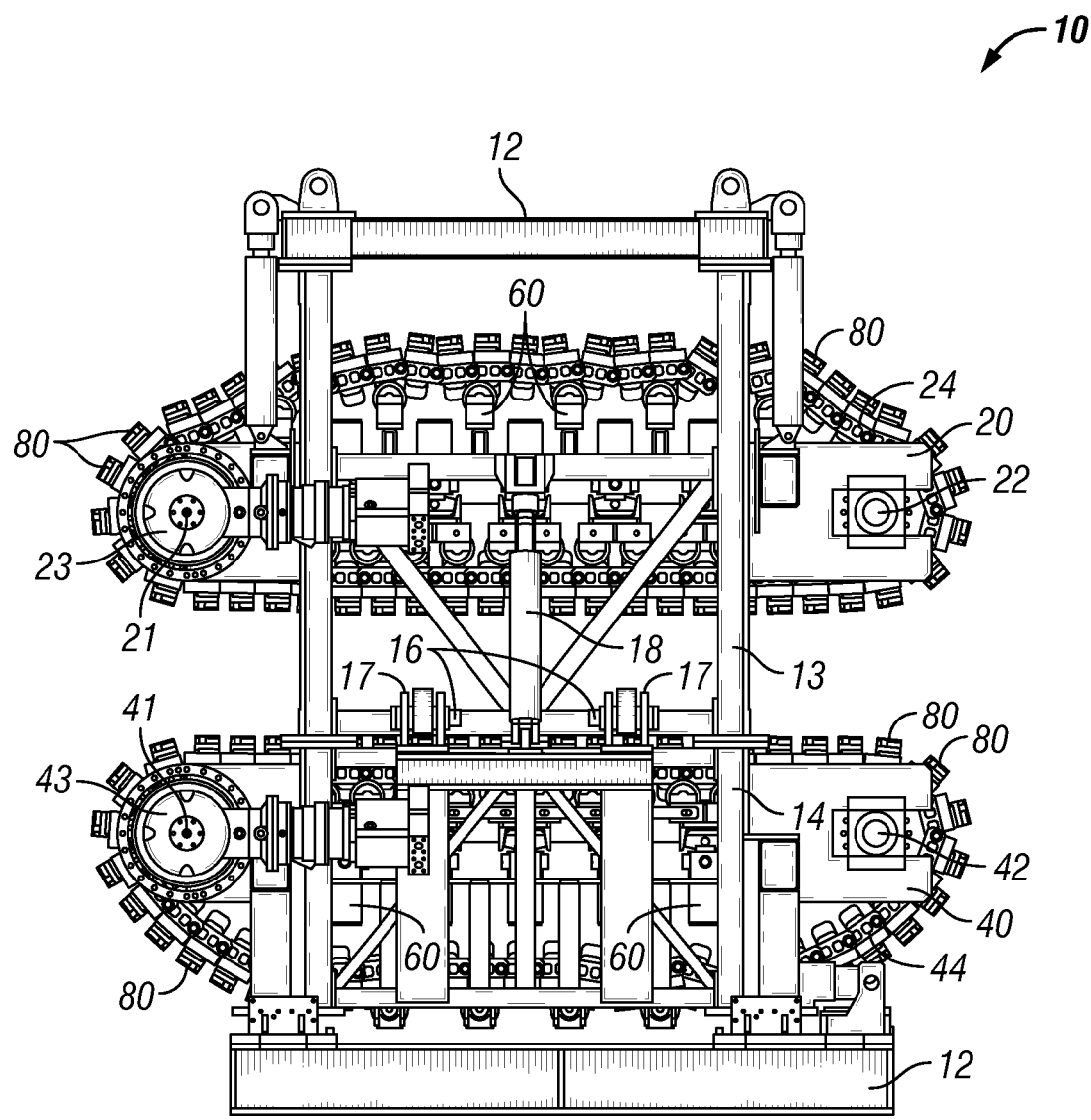
FIG. 1 is a side view of one specific embodiment of a linear pipe tensioner disclosed herein.

Referring now to FIGS. 1-10, in one specific embodiment linear pipe tensioner 10 includes frame 12. In this particular embodiment, frame 12 comprises upper frame member 13 and lower frame member 14 rotatably connected to each other by pivot assembly 15. As shown in FIGS. 1, 2A, and 2B, pivot assembly 15 comprises two hinge members comprising pins 16 inserted through brackets 17, and cylinder 18. Pivot assembly 15 permits the movement of upper track assembly 20 along the trajectory of the arrow shown in FIG. 2B to facilitate insertion of a pipe segment (not shown) within space 30 between upper track assembly 20 and lower track assembly 40.

Although frame 12 is shown as having upper and lower frame members 13, 14 pivotally connected by pivot assembly 15, it is to be understood that frame 12 is not required to have these components. To the contrary, frame 12 may be a structure that is not capable of being opened to facilitate insertion of a pipe segment.

Upper track assembly 20 is operatively associated with upper frame member 13 by front axle 21 and back axle 22 which are rotatable by drive assembly 23 being operatively associated with upper track 24. As shown in the embodiment of FIGS. 1-10, drive assembly 23 is directly connected to front axle 21. Upper track 24 is disposed on a plurality of suspension assemblies 60, front axle 21, and back axle 22. Discussed in greater detail below, track includes a plurality of gripping pads 75 for engaging a pipe segment to facilitate pulling the pipe segment through linear pipe tensioner 10 in a linear direction.

Lower track assembly 40 is operatively associated with lower frame member 14 by front axle 41 and back axle 42 which are rotatable by drive assembly 43 being operatively associated with lower track 44. As shown in the embodiment of FIGS. 1-10, drive assembly 43 is directly connected to front axle 41. Lower track 44 is disposed on a plurality of suspension assemblies 60, front axle 41, and back axle 42 and includes a plurality of gripping pads 75.

Figure 2B:
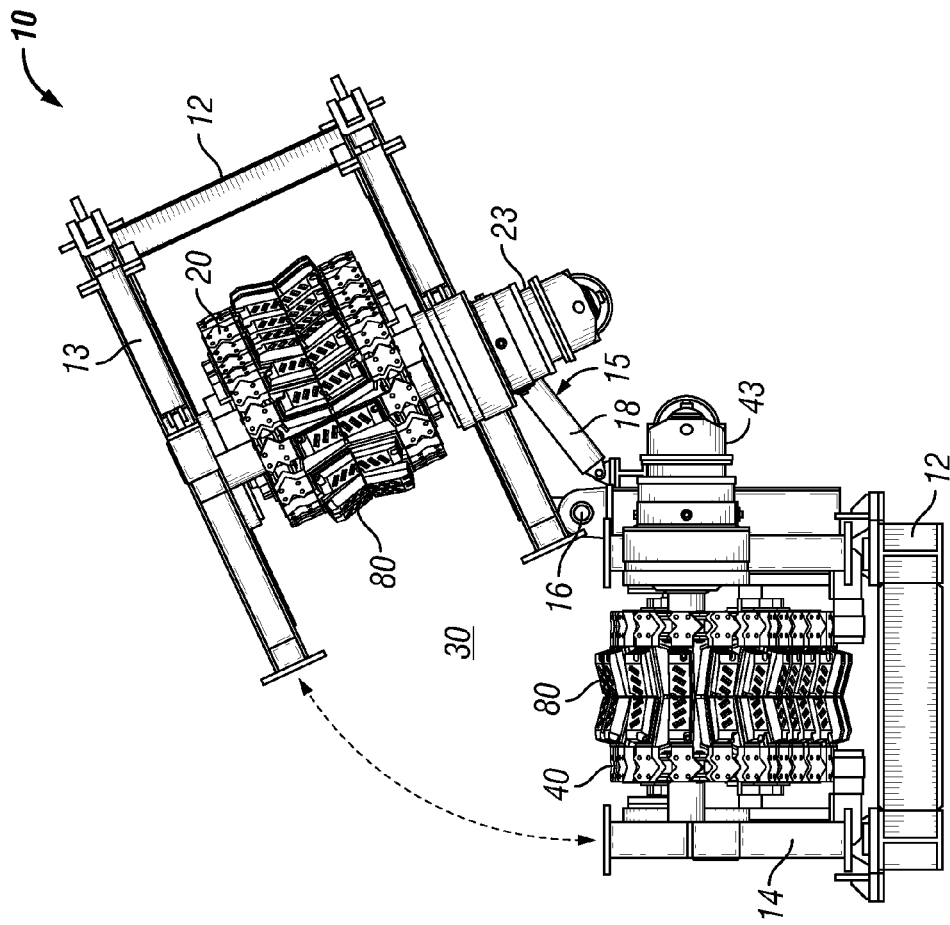
FIG. 2B is a front view of the linear pipe tensioner shown in FIG. 2A showing the top track pivoted to an open position for receiving a segment of pipe.
Figure 2A:
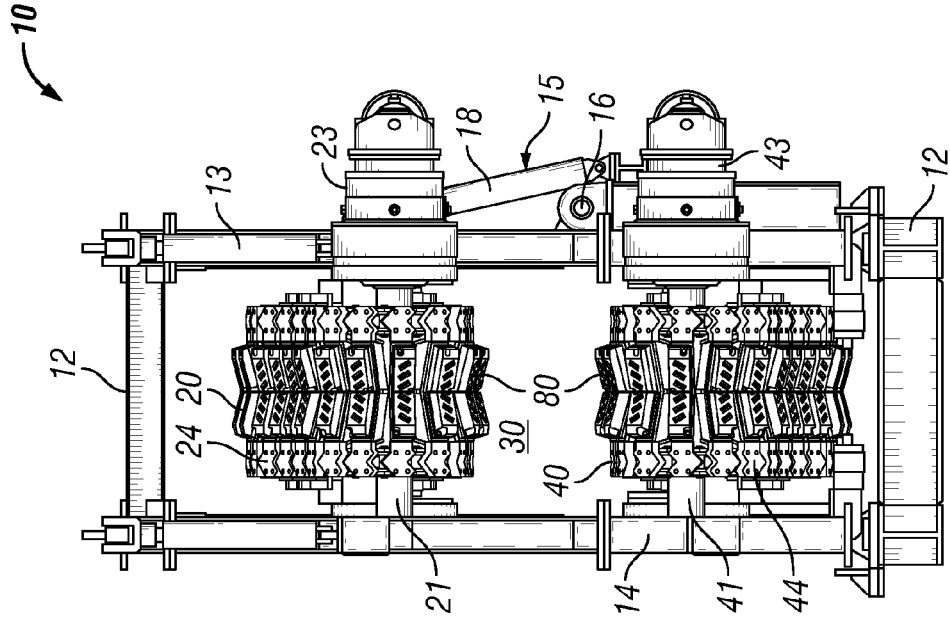
FIG. 2A is a front view of the linear pipe tensioner shown in FIG. 1.

Broadly, in operation of linear pipe tensioner 10, a segment of pipe (not shown) is disposed within area 30, such as by pulling the pipe segment linearly through area 30 or by pivoting upper track assembly 20 to the opened position shown in FIG. 2B, disposing the pipe segment within area 30, and then closing upper track assembly 20. As a result, gripping pads 75 engage the pipe segment above and below the pipe segment. Drive assemblies 23, 43, are activated causing tracks 24, 44 and move around front and back axles, 21, 41, 22, 42. In so doing, the pipe segment is pulled linearly through area 30 causing the pipe segment to be removed from its installed position to its recovered position. As mentioned above, the installed position can be on the ocean floor or within an earthen formation and the recovered position can be on a lay-barge or other ocean-going vessel or on a terrestrial location such as a truck or on the ground of a worksite.

In one particular embodiment, drive assembly 23 and drive assembly 43 are operatively associated with a drive motor flow control system. The drive motor flow control system permits synchronization of rotation of front axles 21, 41. The simultaneous action of drive assemblies 23, 43 prevent one track moving faster than the other track which, in turn, prevents slippage of gripping pads 75. By preventing slippage of gripping pads 75, wear on gripping pads 75 and other components of linear pipe tensioner 10 are reduced. In one such embodiment, a hydraulic power unit supplies fluid to a set of rotary flow dividers or gear pumps that are coupled together by a common shaft. One rotary flow divider/gear pump feeds fluid to drive assembly 23, and the other rotary flow divider/gear pump feeds fluid to drive assembly 43. Coupling both rotary flow divider/gear pumps together causes rotation of both flow divider/gear pumps at the same rate. As a result, the same volume of fluid is delivered to drive assemblies 23, 43 providing simultaneous action of drive assemblies 23, 43. Thus, front axles 21, 41 are rotated at the same. To reduce the likelihood of cavitation when fluid is pumped in the opposite direction through the rotary flow divider/gear pumps, a hot fluid shuttle circuit is disposed between the two rotary flow divider/gear pumps.

Figure 11:
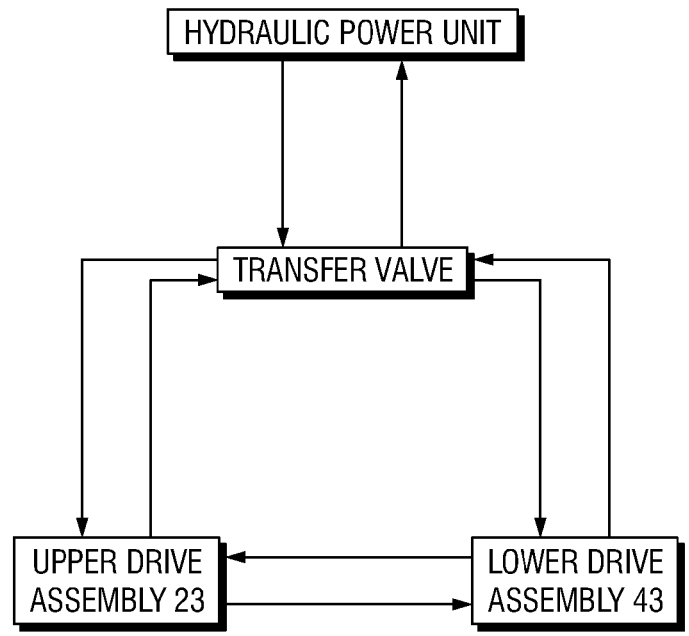
FIG. 11 is a schematic of one specific drive motor flow control system for actuating the drive assemblies of the various linear pipe tensioners disclosed herein.
Figure 12:
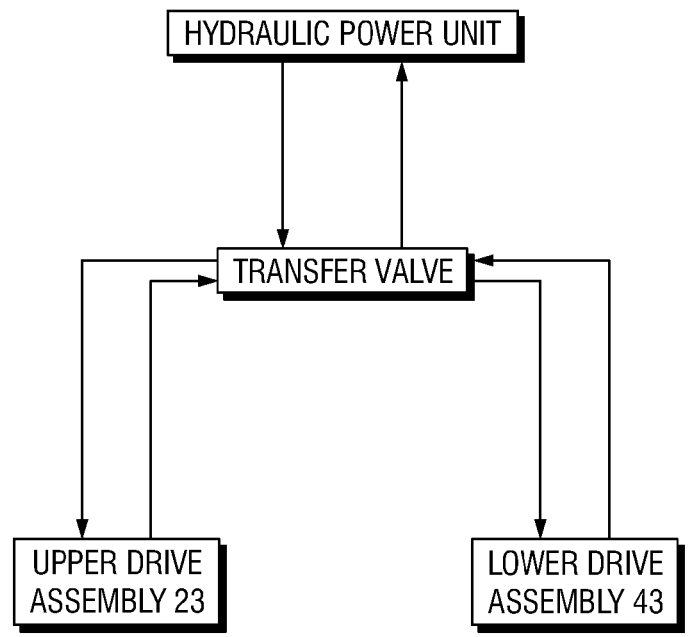
FIG. 12 is a schematic of another specific drive motor flow control system for actuating the drive assemblies of the various linear pipe tensioners disclosed herein.

In another particular embodiment, as illustrated in the schematics of FIGS. 11-12, the drive motor flow control system includes a transfer valve disposed between the hydraulic power unit which supplies fluid to the rotary flow divider/gear pumps. The transfer valve permits the flow of fluid to the rotary flow divider/gear pumps to be changed from being in series (FIG. 11) to being in parallel (FIG. 12), and vice versa. When placed in the "series" mode, the fluid flows from the hydraulic power unit through the transfer valve, to one of drive assemblies 23, 43, to the other of drive assemblies 23, 43, back through the transfer valve to the hydraulic power unit, as illustrated by the clockwise and counterclockwise arrows between the transfer valve, the upper drive assembly 23, and the lower drive assembly 43 shown in FIG. 11. For example, the fluid can flow from the hydraulic power unit through the transfer valve, to drive assembly 23, to drive assembly 43, back through the transfer valve (counterclockwise in FIG. 11), and to the hydraulic power unit. Alternatively, the fluid can flow from the hydraulic power unit through the transfer valve, to drive assembly 43, to drive assembly 23, back through the transfer valve (clockwise in FIG. 11), and to the hydraulic power unit. Thus, the "series" mode functions as discussed above to provide synchronization of rotation of front axles 21, 41 such as during pipe recovery operations.

When placed in the "parallel" mode, as shown in FIG. 12, the fluid flows from the hydraulic power unit through the transfer valve and to drive assemblies 23, 43 simultaneously before being transported back through the transfer valve to the hydraulic power unit. Thus, the "parallel" mode allows the two drive assemblies 23, 43 to operate independently of each other to provide rapid response and speed from both drive assemblies 23, 43 when demanded such as during pipe lay operations.

To facilitate switching between the "parallel" mode and the "series" mode, the transfer valve is operatively associated with an electronics package.

Figure 3:
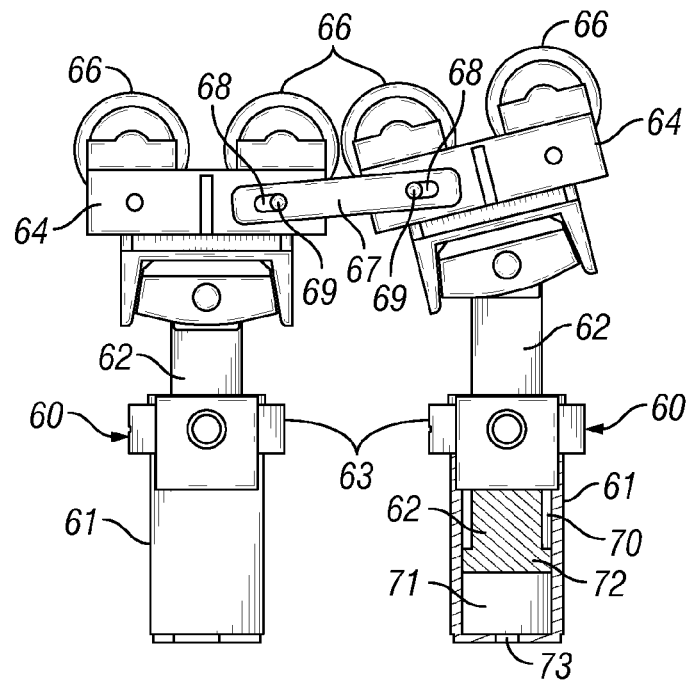
FIG. 3 is a partial cross-sectional side view of a roller assembly of the linear pipe tensioner shown in FIG. 1.
Figure 4:
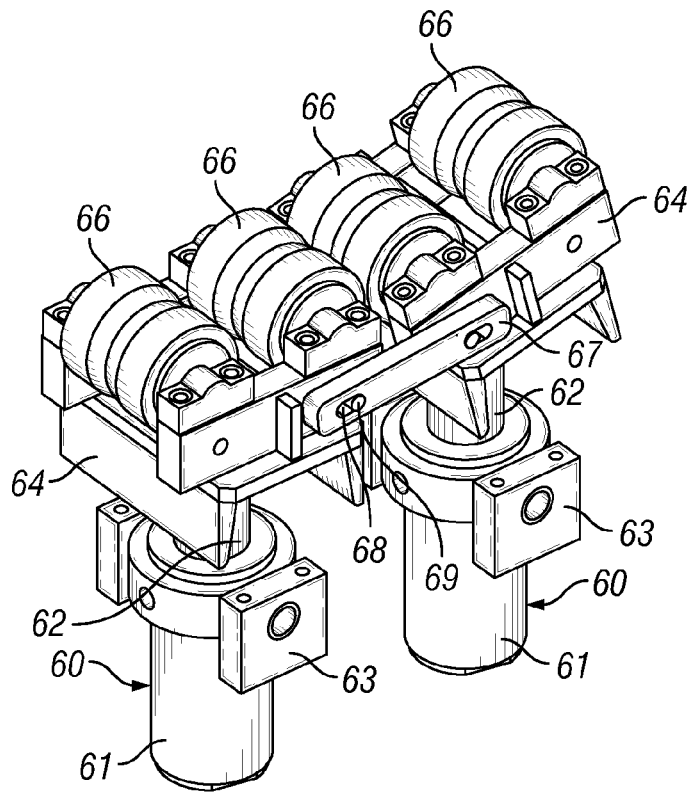
FIG. 4 is a perspective view of the roller assembly of FIG. 3.

Referring now to FIGS. 3-4, roller assemblies 60 each comprise hydraulic cylinder 61 having hydraulic piston 62 disposed therein. Hydraulic cylinders 61 have hydraulic fluid (not shown) disposed therein. As shown in FIG. 3, hydraulic cylinders 61 comprise upper chamber 70 and lower chamber 71 divided by divider 72. Divider 72 is in sliding engagement with the inner wall surfaces of upper and lower chambers 70, 71. Aperture 73 is in fluid communication with lower chamber 71. As shown in FIG. 3, aperture 73 is disposed in the bottom of hydraulic cylinder 61. It is to be understood that aperture 73 is not required to be disposed in the bottom of hydraulic cylinder 61. Connected to aperture 73 is a hose (not shown) that places aperture 73 and, thus, lower chamber 71, in fluid communication with a reservoir (not shown). Each hose can be connected to a separate reservoir. Alternatively, the hoses can be connected to a manifold on the reservoir. Thus, lower chambers 71 function as accumulators to facilitate movement of hydraulic piston 62 within hydraulic cylinder 61.

Roller assemblies 60 also comprise swivel members 63 to facilitate rotational movement of piston 62, roller carriage 64 pivotally connected to an upper end of piston 62 for pivotal movement of roller carriages 64 and, thus, rollers 66. Roller carriages 64 are pivotally connected to each other such as by bar 67 having slots 68 for receiving pins 69 that are secured to roller carriages 64.

In the arrangement shown in FIGS. 3-4, cylinders 61 and pistons 62 provide up and down movement of rollers 66, swivel members 63 provide rotational movement of rollers 66, and roller carriages 64 and bar 67 provide longitudinal pivoting of rollers 66 between adjacent roller carriages 64. Therefore, this arrangement provides tracks 24, 44 to be compliant or adjustable as the pipe segment linearly moves through linear pipe tensioner 10 so as to adjust for any changes in shape or outer diameter size of the pipe segment caused by such items as cement, biological growth, anodes, valves, bent portions of the pipe segment, and the like as those portions of the pipe segment pass through linear pipe tensioner 10.

Referring now to FIGS. 5-10, in one embodiment of gripping pads 75, gripping pad 75 comprises gripping member plate 80, top plate 90, and compliant member 92. Gripping member plate 80 comprises bottom surface 81, top surface 82 (best shown in FIGS. 8-10), two longitudinal side surfaces 83, and two lateral side surfaces 84. In the embodiment of FIGS. 5-10, top plate 90 includes shoulder 91 running the length of one of the two longitudinal side surfaces of top plate 90 to facilitate placement of gripping pad 75 on tracks 24, 44 at the desired or necessary orientation to facilitate gripping pad 75 engaging the pipe section so that the pipe section can be pulled through linear pipe tensioner 10. Top plate 90 also includes one or more slots (not shown) for receiving gripping members, such as gripping members 100 discussed in greater detail below.

Disposed on an upper surface of top plate 90 is compliant member 92. Complaint member 92 can be bonded or molded to the upper surface of top plate 90. Complaint member 92 can be formed out of any material that, when placed under load, can compress and, when the load is removed, return toward its original configuration. In one particular embodiment, complaint member 92 is formed out of a resilient, elastomeric or polymeric material of a commercially available type that will withstand high temperatures that occur in some wells. Preferably, the durometer hardness of material forming the complaint member 92 is in the range from about 60 to 100 Shore A and more particularly from 80 to 90 Shore A. In one embodiment, the durometer hardness is about 85 Shore A.

Compliant member 92 comprises a bottom surface that is engaged with the upper surface of top plate 90, top surface 93, two longitudinal side surfaces 94, and two lateral side surfaces 95. Complaint member 92 includes one or more slots 96 for receiving gripping members 100 (discussed in greater detail below with respect to FIGS. 8-10). In the embodiment of FIGS. 5-10, compliant member 92 also includes grooves 97, 98 to permit access to two of the fastener openings 110 (FIGS. 8-9) disposed through top plate 90 and gripping plate member 80 to facilitate securing gripping pads 75 to tracks 24, 44. In the embodiment shown in FIGS. 5-10, top surface 93 of compliant member 92 also includes beveled portion 99 to facilitate gripping the pipe (not shown).

Figure 8:
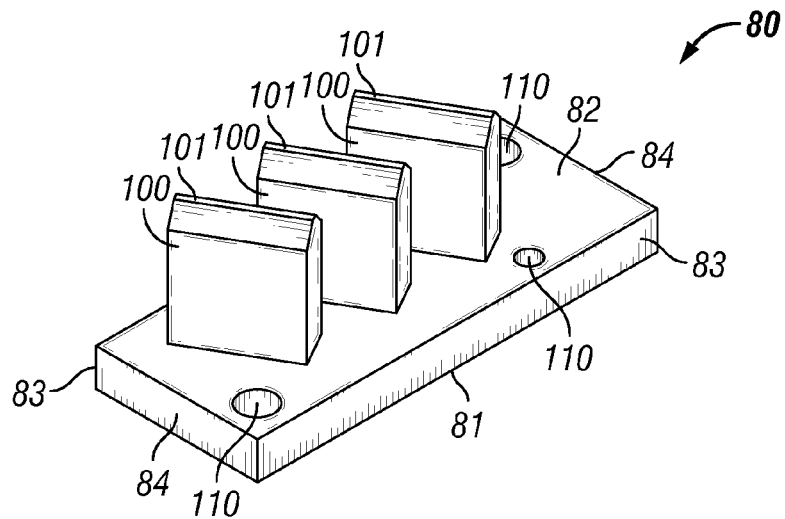
FIG. 8 is a perspective view of the gripping member plate of the gripping pad of FIG. 5.
Figure 9:
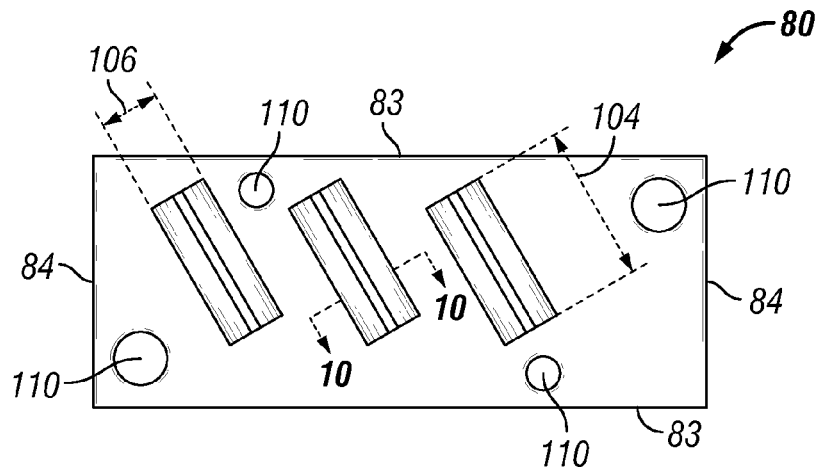
FIG. 9 is a top view of the gripping member plate of FIG. 8.
Figure 10:
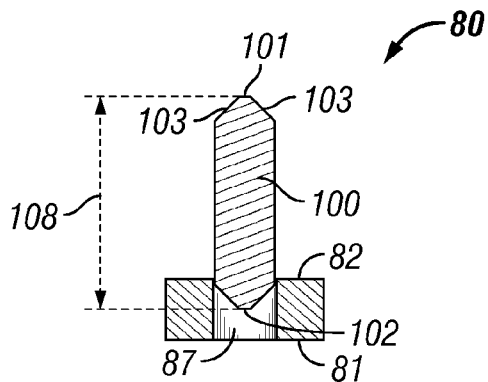
FIG. 10 is a partial cross-sectional view of the gripping member plate of FIG. 8 taken along line 10-10 shown in FIG. 9.

Referring now to FIGS. 8-10 gripping member plate 80 comprises three identical gripping members 100. Gripping members 100 comprise an upper end 101, a lower end 102, and length 104, width 106, and a height 108. Upper end 101 includes chamfers 103 to provide a point at upper end 101. As shown in the specific embodiment of FIGS. 8-10, gripping members 100 are rectangular-shaped and disposed at non-right angles relative to both the longitudinal axis and the lateral axis of gripping member plate 80.

Figure 5:
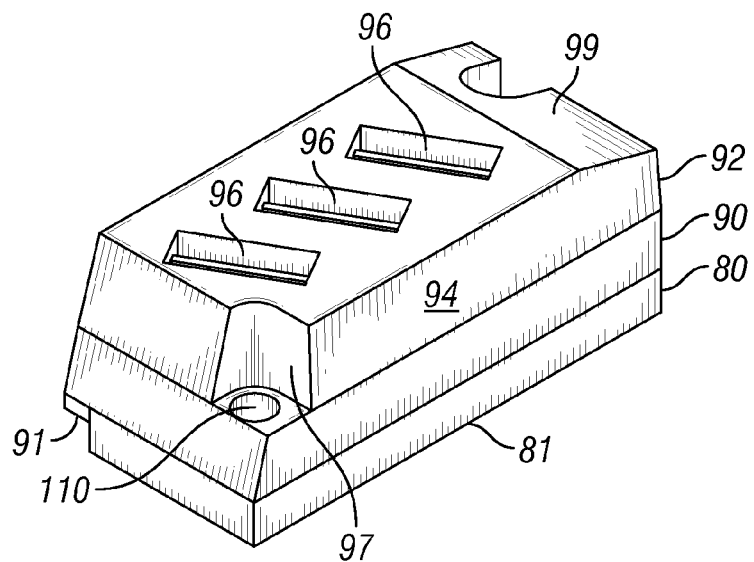
FIG. 5 is a perspective view of a gripping pad of the linear pipe tensioner shown in FIG. 1.
Figure 6:
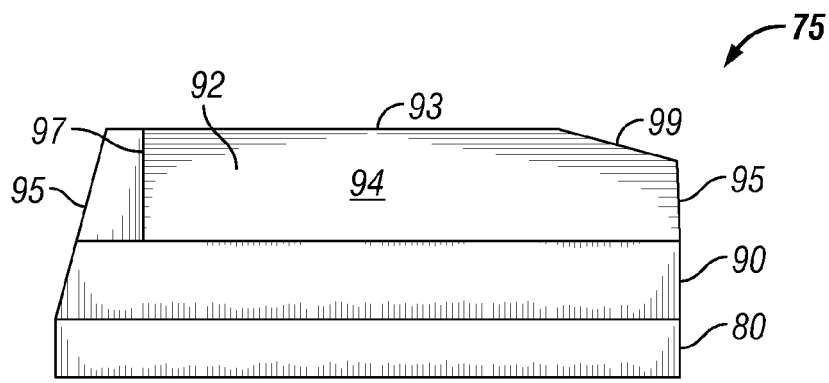
FIG. 6 is a longitudinal side view of the gripping pad of FIG. 5.
Figure 7:
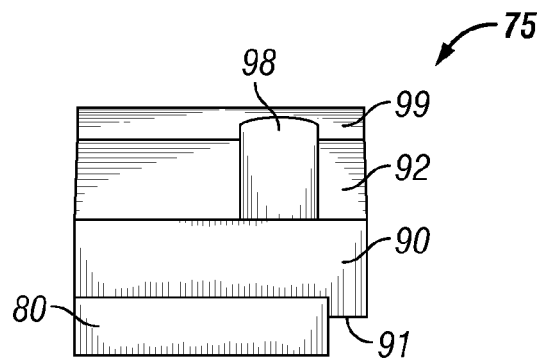
FIG. 7 is a lateral side view of the gripping pad of FIG. 5.

Length 104, width 106, and height 108 may be any measurement desired or necessary to facilitate gripping the pipe segment when gripping pad 75 engages the pipe segment. As shown in FIG. 5, in this particular embodiment height 108 is such that gripping members 100 do not protrude out of slots 96 of compliant member 92 when gripping pad 75 is not engaged with the pipe segment. In one particular embodiment, gripping members 100 are rectangular-shaped having length 104 in the range from 1.75 inches to 2.25 inches, width in the range from 0.60 inches to 0.85 inches, and height 108 in the range from 2.5 inches to 2.75 inches. In specific embodiments, upper ends 101 of gripping members 100 do not protrude out of slots 96 to facilitate protecting upper ends 101 from being damaged, prior to gripping pad 75 engaging a pipe segment and compliant member 92 being compressed to expose upper ends 101 of gripping members 100. In certain of these embodiments, the height of slots 96 can be approximately 10-15% longer in length as compared to height 108. Thus, in embodiments where height 108 is in the range from 2.5 inches to 2.75 inches, slots 96 have a height in the range from 2.75 inches to 3.1625 inches.

As mentioned above, gripping member plate 80 and top plate 90 include a number of fastener holes 110 for receiving fasteners (not shown) to secure top plate 90 to gripping member plate 80 and to secure gripping member plate 80 to tracks 24, 44.

Although gripping member plate 80 is shown as having three identical gripping members 100, it is to be understood that the number of gripping members 100 and the shapes, and sizes of gripping member 100 is not required to be identical. To the contrary, each gripping member 100 can be different in shape and size as compared to the other gripping members 100. In addition, the number of gripping members 100 can be any number desired or necessary to provide sufficient gripping engagement with the pipe segment disposed within area 30 of linear pipe tensioner 10. For example, a single gripping member 100 may be disposed on gripping member plate 80. Alternatively, one or more of the gripping members 100 can be cylindrically shaped with a pointed tip. In addition, the tip(s) of each gripping member 100 can comprise angled spikes or other configurations and can be formed out of a hardened material, such as carbide, to further facilitate gripping the pipe segment.

Broadly, in one specific embodiment of an operation using the linear pipe tensioners disclosed herein, a pipe segment is disposed between the upper and lower tracks by pivoting the upper track from a closed position to an opened position. Upon being disposed between the upper and lower tracks, the drive assemblies are actuated either in parallel mode or series mode as discussed above. In so doing, the pipe segment, which can be a series of pipe joints forming a pipeline, is moved linearly through the linear pipe tensioner to either recover pipeline from the ocean or to lay pipeline on the ocean floor. During operation of certain of the linear pipe tensioners, one or more roller assemblies operatively associated within the upper track and/or the lower track, move, pivot, and/or rotate to accommodate fluctuations in the outer diameter of the pipeline being moved through the linear pipe tensioner. In addition, gripping pads having one or more gripping members disposed through a compliant member engage the pipeline, such as due to the compression of the compliant member, to facilitate linear movement of the pipeline through the linear pipe tensioner.

It is to be understood that the invention is not limited to the exact details of construction, operation, exact materials, or embodiments shown and described, as modifications and equivalents will be apparent to one skilled in the art. For example, the gripping members are not required to have sharpened upper ends, nor are they required to be rectangular-shaped as shown in the Figures. Instead, the gripping members can be spikes with or without sharpened upper ends, or any other shape desired or necessary to provide adequate gripping of the pipe segment. In addition, as discussed above, the gripping members 100 are not required to be identical in shape or size and can be as few as one or as many as desired or necessary to facilitate gripping of the pipe segment. Further, the pivot assembly is not required to include a hydraulic cylinder, but instead can comprise a swivel member such as a ball joint, or other hinge assembly. Moreover, the roller carriages can be pivotally connected to one another using devices other than the bar and pin connection shown in the Figures, such as ball joints and the like. Additionally, each roller carriage can include as few as one roller or three or more rollers instead of the two rollers shown in the Figures. Further, the gripping pads are not required to include both a top plate and a gripping member plate. To the contrary, a single plate can provide the gripping members and can receive the complaint member. Accordingly, the invention is therefore to be limited only by the scope of the appended claims.

What is claimed is:

1. A linear pipe tensioner comprising:
    a frame;
    a first track assembly having a first track operatively associated with two first track axles, the first track assembly being secured to the frame;
    a second track assembly having a second track operatively associated with two second track axles, the second track assembly being secured to the frame above the first track to define a pathway between the first track and the second track for receiving a pipe;
    a first roller assembly operatively associated with the first track, the first roller assembly having a first roller operatively associated with a first roller carriage, the first roller carriage being pivotally connected to a first hydraulic piston operatively associated with a first hydraulic cylinder, the first hydraulic cylinder having a first hydraulic accumulator disposed within the first hydraulic cylinder, the first hydraulic cylinder operatively associated with a first swivel member for rotational movement of the first hydraulic piston; and
    a second roller assembly operatively associated with the first track, the second roller assembly having a second roller operatively associated with a second roller carriage, the second roller carriage being pivotally connected to a second hydraulic piston operatively associated with a second hydraulic cylinder, the second hydraulic cylinder having a second hydraulic accumulator disposed within the second hydraulic cylinder, the second hydraulic cylinder operatively associated with a second swivel member for rotational movement of the second hydraulic piston,
    wherein the first roller carriage is pivotally connected to the second roller carriage by a bar having first and second slots, and wherein the first slot is operatively associated with a first pin operatively associated with the first roller carriage and the second slot is operatively associated with a second pin operatively associated with the second roller carriage.

2. The linear pipe tensioner of claim 1, wherein the first roller assembly comprises a plurality of rollers operatively associated with the first roller carriage and the second roller assembly comprises a plurality of rollers operatively associated with the second roller carriage.

3. A linear pipe tensioner comprising:
    a frame;
    a first track assembly secured to the frame, the first track assembly having a first track operatively associated with two first track axles, the first track having a first gripping pad, the first gripping pad having a first compliant member having at least three slots, and at least three gripping members disposed within the respective slots, the gripping members comprising a rectangular shape having an upper end, the upper end having at least one chamber to provide a point, the three gripping members being disposed in their corresponding slots within the first compliant member at non-right angles relative to a lateral axis and a longitudinal axis of the first gripping pad; and
    a second track assembly having a second track operatively associated with two second track axles, the second track assembly being secured to the frame above the first track to define a pathway between the first track and the second track for receiving a pipe.

4. The linear pipe tensioner of claim 3, wherein the gripping members protrude through their respective slots during compression of the first compliant member.

5. The linear pipe tensioner of claim 4, wherein the gripping members are fully disposed within their respective slots prior to compression of the first compliant member.

6. The linear pipe tensioner of claim 5, wherein the gripping members are disposed on a first gripping member plate.

7. The linear pipe tensioner of claim 3, wherein the second track includes a second gripping pad, the second gripping pad having a second compliant member having a second slot and a second gripping member disposed within the second slot.

8. The linear pipe tensioner of claim 3, wherein the first track includes a plurality of first track gripping pads operatively associated with the first track, each of the first track gripping pads having a compliant member having a slot and a gripping member disposed within the slot, and
    wherein the second track includes a plurality of second track gripping pads operatively associated with the second track, each of the second track gripping pads having a compliant member having a slot and a gripping member disposed within the slot.

9. A linear pipe tensioner comprising:
    a frame;
    a first track assembly secured to the frame, the first track assembly having a first track operatively associated with two first track axles, and a first drive assembly operatively associated with at least one of the two first track axles, the first drive assembly being in fluid communication with a hydraulic motor through a transfer valve, the first track assembly having a first gripping pad, the first gripping pad having a first compliant member having at least three slots, and at least three gripping members disposed within the respective slots, the gripping members comprising a rectangular shape having an upper end, the upper end having at least one chamber to provide a point, the three gripping members being disposed in their corresponding slots within the first compliant member at non-right angles relative to a lateral axis and a longitudinal axis of the first gripping pad; and a second track assembly having a second track operatively associated with two second track axles and a second drive assembly operatively associated with at least one of the two second track axles, the second drive assembly being in fluid communication with the hydraulic motor through the transfer valve, wherein the transfer valve comprises a first setting in which a hydraulic fluid flows simultaneously to the first and second drive assemblies, and a second setting in which the hydraulic fluid flows to the first or second drive assembly and then to the other of the first or second drive assembly, the transfer valve being actuatable between the first and second settings.

10. A linear pipe tensioner comprising:

a frame;

a first track assembly having a first track operatively associated with two first track axles, the first track assembly being secured to the frame;

a second track assembly having a second track operatively associated with two second track axles, the second track assembly being secured to the frame above the first track to define a pathway between the first track and the second track for receiving a pipe;

a first roller assembly operatively associated with the first track, the first roller assembly having a first roller operatively associated with a first roller carriage, the first roller carriage being pivotally connected to a first hydraulic piston operatively associated with a first hydraulic cylinder, the first hydraulic cylinder operatively associated with a first swivel member for rotational movement of the first hydraulic piston; and a second roller assembly operatively associated with the first track, the second roller assembly having a second roller operatively associated with a second roller carriage, the second roller carriage being pivotally connected to a second hydraulic piston operatively associated with a second hydraulic cylinder, the second hydraulic cylinder operatively associated with a second swivel member for rotational movement of the second hydraulic piston, wherein the first roller carriage is pivotally connected to the second roller carriage by a bar having first and second slots, and wherein the first slot is operatively associated with a first pin operatively associated with the first roller carriage and the second slot is operatively associated with a second pin operatively associated with the second roller carriage.

11. The linear pipe tensioner of claim 10, further comprising a third roller assembly operatively associated with the second track, the third roller assembly having a third roller operatively associated with a third roller carriage, the third roller carriage being pivotally connected to a third hydraulic piston operatively associated with a third hydraulic cylinder.

12. The linear pipe tensioner of claim 10, wherein the first track further comprises a plurality of first track roller assemblies operatively associated with the first track, each of the first track roller assemblies having a roller operatively associated with a roller carriage, the roller carriage being pivotally connected to a hydraulic piston operatively associated with a hydraulic cylinder, and wherein the second track comprises a plurality of second track roller assemblies operatively associated with the second track, each of the second track roller assemblies having a roller operatively associated with a roller carriage, wherein the roller carriage is pivotally connected to a hydraulic piston operatively associated with a hydraulic cylinder, and wherein the hydraulic cylinders are operatively associated with swivel members for rotational movement of the hydraulic pistons.

13. The linear pipe tensioner of claim 12, wherein adjacent roller assemblies are pivotally connected by means of a slotted bar in operative association with the adjacent roller carriages.

14. The linear pipe tensioner of claim 10, wherein the first roller assembly comprises a plurality of rollers operatively associated with the first roller carriage and the second roller assembly comprises a plurality of rollers operatively associated with the second roller carriage.

* * * * *